March 13, 1934.   C. GIRL ET AL   1,951,145
PARKING DEVICE FOR VEHICLES
Filed Nov. 13, 1931   5 Sheets-Sheet 1

INVENTORS:
CHRISTIAN GIRL
FRANCIS M. CASE
BY Hull, Brock & West
ATTORNEYS

March 13, 1934. C. GIRL ET AL 1,951,145

PARKING DEVICE FOR VEHICLES

Filed Nov. 13, 1931 5 Sheets-Sheet 2

INVENTORS:
CHRISTIAN GIRL
FRANCIS M. CASE
BY Hull, Brock & Weeks
ATTORNEYS

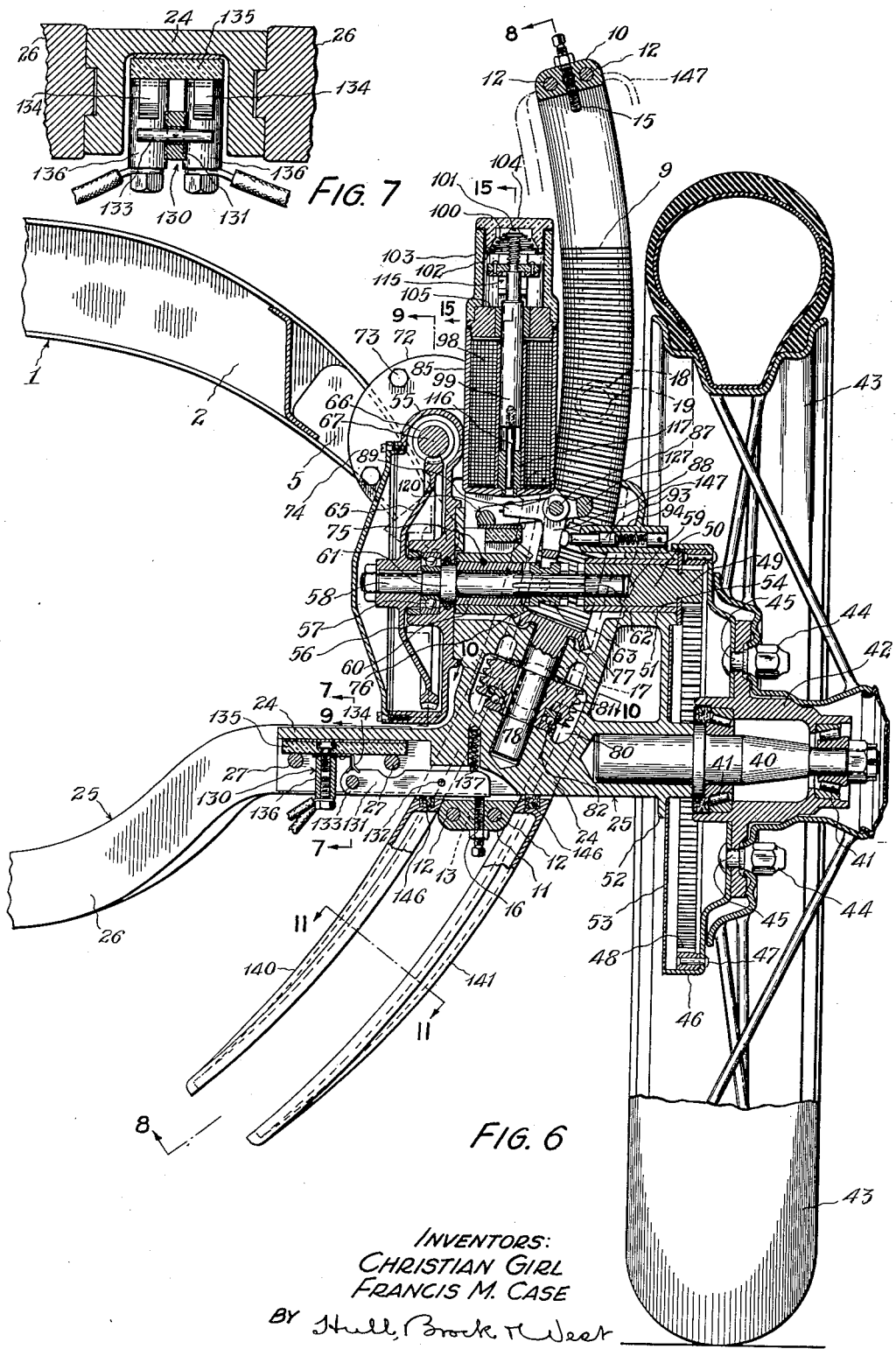

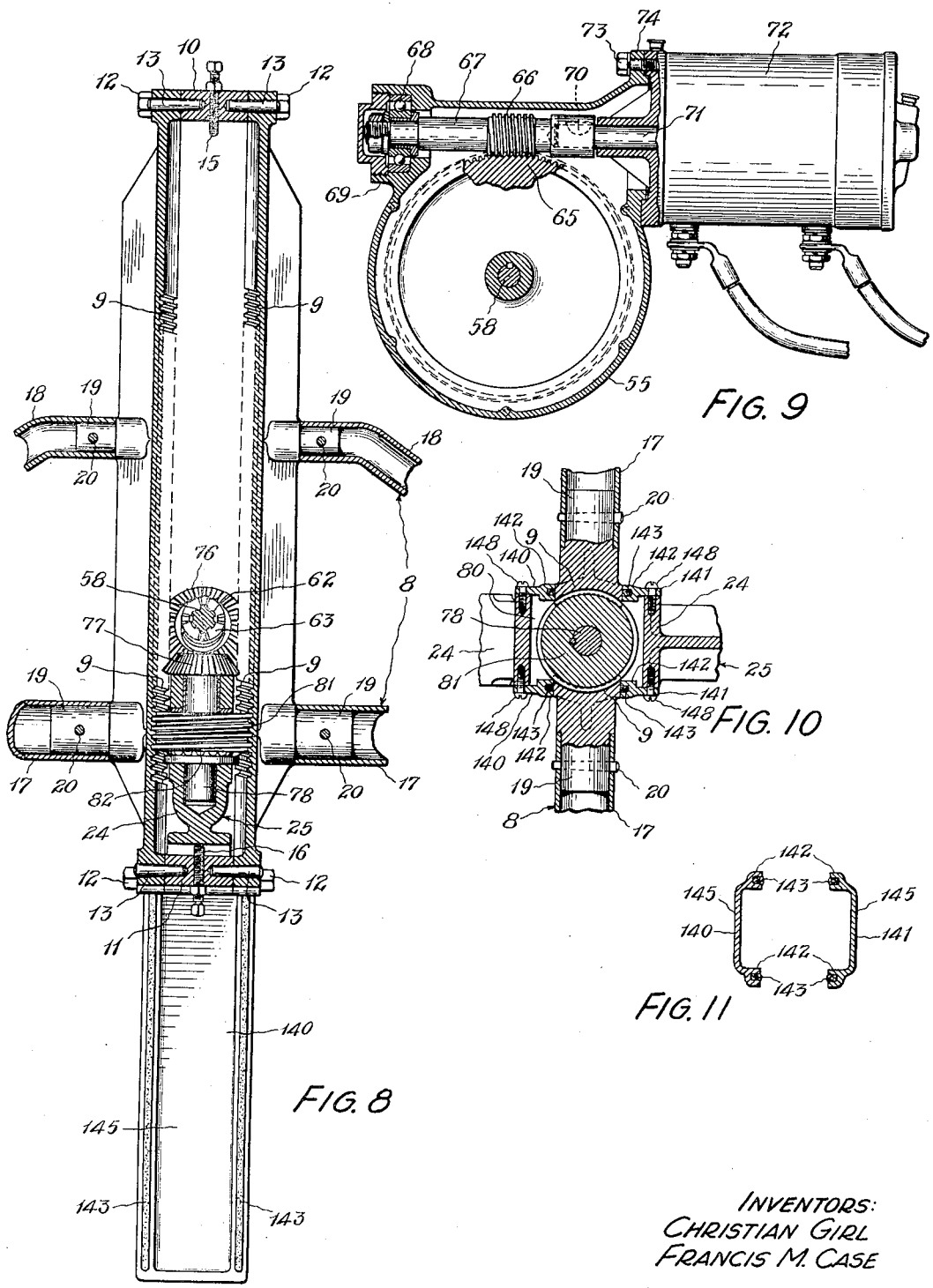

March 13, 1934.  C. GIRL ET AL  1,951,145
PARKING DEVICE FOR VEHICLES
Filed Nov. 13, 1931  5 Sheets-Sheet 5
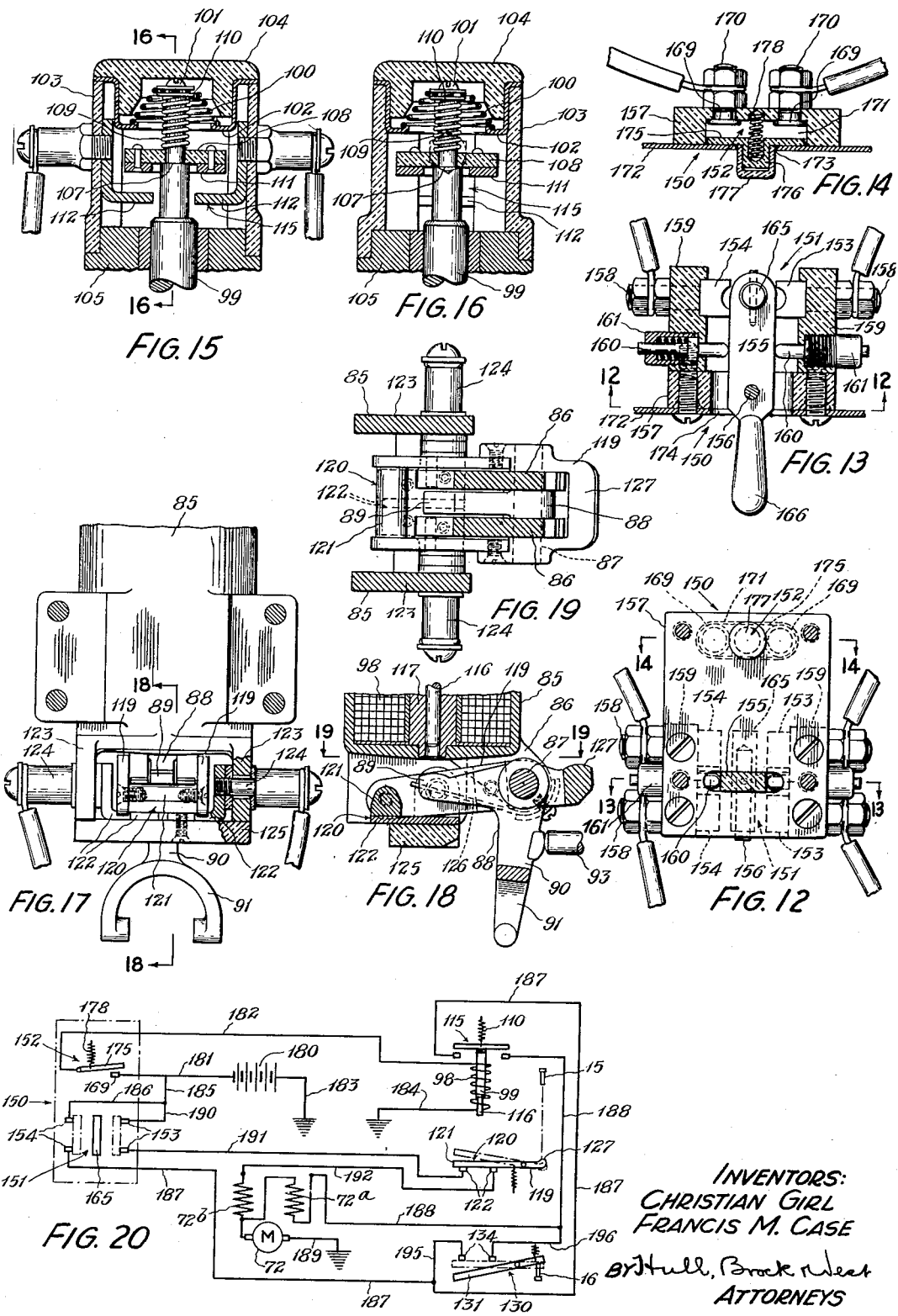
INVENTORS:
CHRISTIAN GIRL
FRANCIS M. CASE
By Hull, Brock & West
ATTORNEYS Patented Mar. 13, 1934

1,951,145

UNITED STATES PATENT OFFICE 1,951,145

PARKING DEVICE FOR VEHICLES

Christian Girl, Madison, and Francis M. Case, Cleveland Heights, Ohio; said Case assignor to said Girl Application November 13, 1931, Serial No. 574,806

20 Claims. (Cl. 180—1)

This invention pertains to parking devices for vehicles, particularly of the class in which the device serves normally as the spare wheel or tire carrier and wherein such wheel—or a wheel on which the spare tire and rim are mounted—it utilized as a supporting and propelling means for the vehicle during the shifting of the same into and out of the parking space.

The more general objects of the invention are to provide an efficient device of the above character that is of substantial, durable and relatively simple construction; to provide a device of said character that is compact, neat of appearance, and comparatively light of weight; and to provide a parking device that is adapted to standard vehicle construction thereby to avoid the necessity of making any appreciable change in the vehicle to permit of the installation of the device.

Other objects of the invention are to provide a power operated parking device in which the control is located within convenient reach of the driver of the vehicle thereby rendering the use of the device especially convenient; and, more limitedly, to provide a power operated parking device in which the driving means is adapted to be operatively connected to means for raising and lowering the vehicle, and to means for rotating the ground wheel of said device and in which the aforesaid control may be used to effect, at will, driving connections between said driving means and either of the other means just mentioned.

Another object of the invention is to provide a parking device comprising two relatively movable units, together with mechanism for effecting relative movement between said units, the respective units incorporating parts of a casing that are so disposed with respect to one another when said units are in normal relation as to enclose and protect the working parts of said mechanism.

Figure 1:
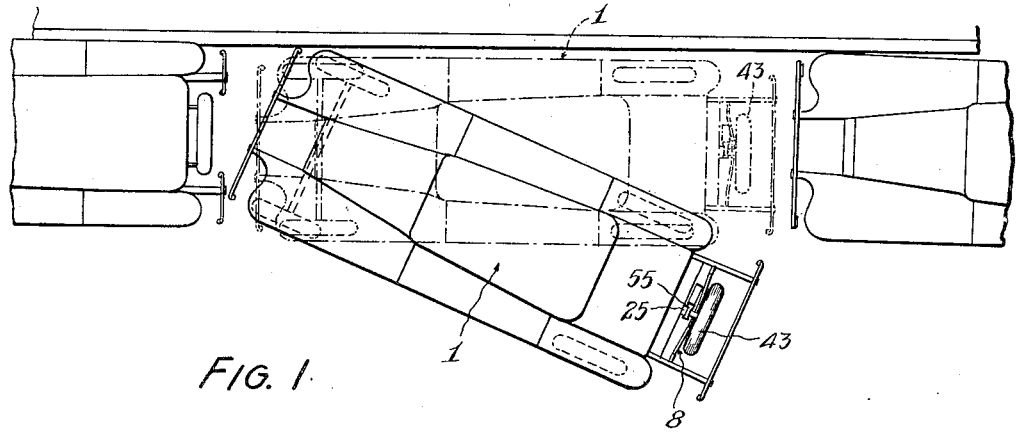
Figure 2:
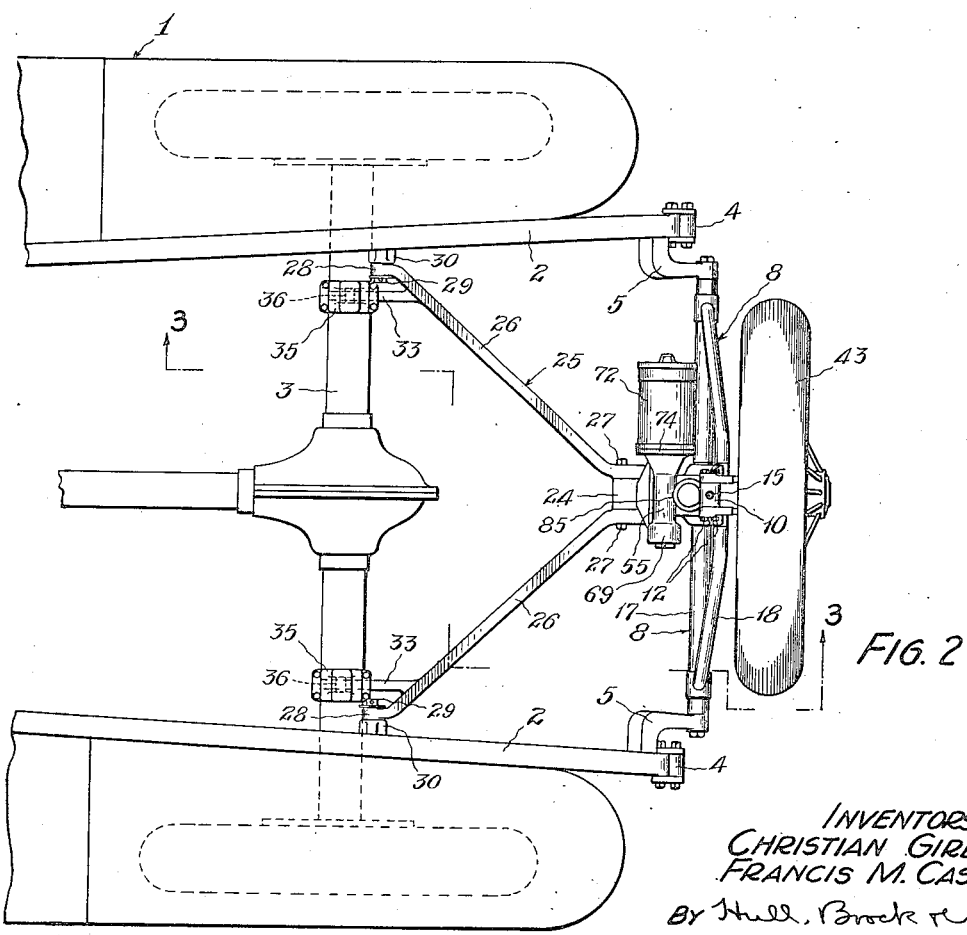
Figure 4:
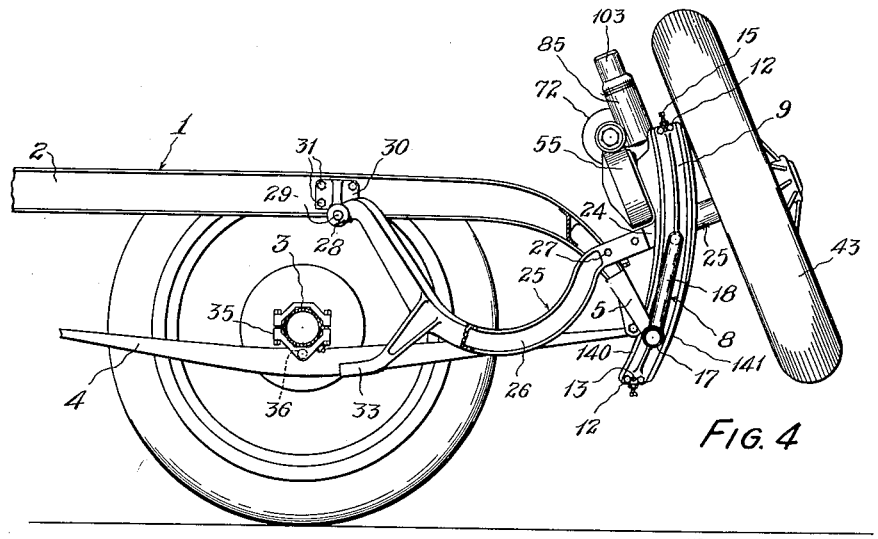
Figure 3:
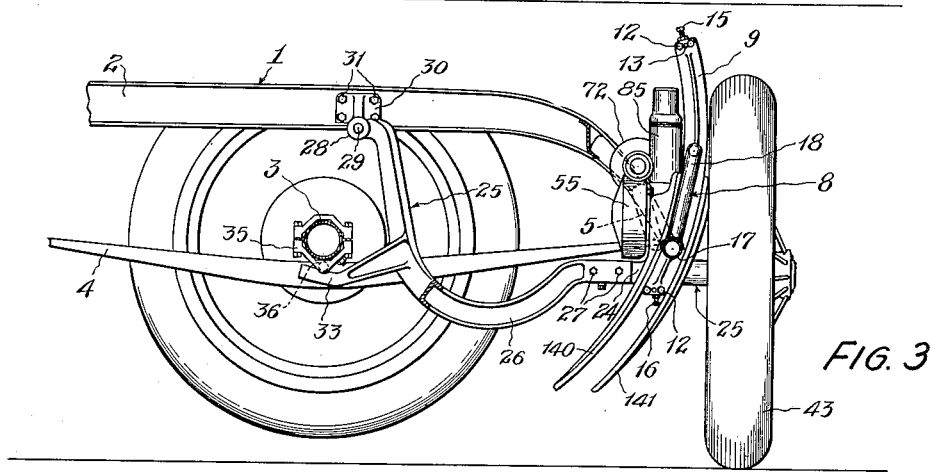
Figure 5:
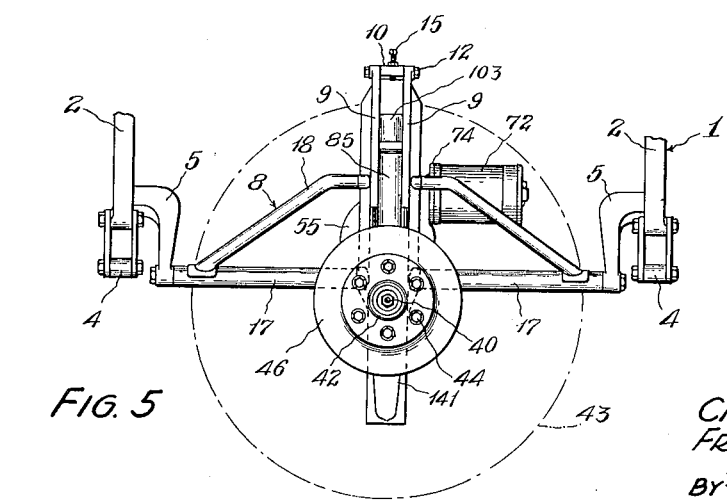

The foregoing objects, with other and more detailed ones that will appear during the course of the following description, are attained in the embodiment of the invention illustrated in the accompanying drawings wherein Fig. 1 is a plan view of an automobile equipped with the invention, showing the manner in which it may be parked in a relatively short space between other vehicles; Fig. 2 is a fragmentary plan view of the chassis of an automobile equipped with our improved parking device and showing it in operative position; Fig. 3 is a sectional side elevation of the parts shown in Fig. 2, the section being taken in different planes, as indicated by the line 3—3 of Fig. 2; Fig. 4 is a view similar to Fig. 3 showing the parking device in normal position; Fig. 5 is a rear view of the parking device and adjacent portions of the vehicle chassis with the wheel shown in dot-and-dash lines; Fig. 6 is a central vertical section, on a scale considerably enlarged over that of the preceding views, through the rear end of the parking device and the adjacent portion of the vehicle chassis, the parts being in operative position, as in Fig. 3; Fig. 7 is a sectional detail on the line 7—7 of Fig. 6; Fig. 8 is a developed, transverse sectional view through the central portion of the device on the line 8—8 of Fig. 6; Figs. 9, 10 and 11 are sectional details on the respective lines 9—9, 10—10 and 11—11 of Fig. 6; Fig. 12 is a sectional front elevation of the control switch for the device; Figs. 13 and 14 are sectional details on the respective lines 13—13 and 14—14 of Fig. 12; Fig. 15 is a sectional detail of the solenoid operated switch, the plane of section being indicated by the line 15—15 of Fig. 6; Fig. 16 is a section on the line 16—16 of Fig. 15; Fig. 17 is an elevational view of a solenoid operated clutch shifting means and a stop switch for limiting relative movement between the major units of the parking device in one direction, parts being broken away to better illustrate certain details of the switch; Fig. 18 is a section on the correspondingly numbered line of Fig. 17; Fig. 19 is a sectional plan taken on the line 19—19 of Fig. 18, and Fig. 20 is a wiring diagram showing, conventionally, the electrical devices and circuits involved in the parking device.

Turning now to a detailed description of the invention by the use of reference characters, 1 designates, generally, the vehicle and 2 the side members of the frame or chassis thereof, while 3 designates the rear axle from which the corresponding end of the frame or chassis is suspended through springs 4. For the purpose of claims, we will, in some instances, refer to the body portion of the vehicle, including the frame or chassis, as the superstructure.

Extending inwardly and rearwardly from the rear end of the side members 2 of the vehicle frame or chassis are substantial arms or brackets 5 and these may be integral parts of fittings that are built into the rear ends of the side members 2 as substitutes for the standard fittings that provide the eyes for the attachment of the spring shackles, the present fittings including such eyes. Pivotally supported by and between the lower ends of the brackets 5 is a frame or unit designated generally by the reference numeral 8 (Figs. 2 and 5). The central portion of this frame, as shown in detail in Fig. 8, is constructed of opposed arcuate, angular gear racks 9, that are spaced apart at top and bottom by blocks 10 and 11, respectively, and are fastened together by bolts 12, dowel pins 13 being employed for insuring proper relative positioning of the parts. Adjustable stops 15 and 16 are carried by the respective blocks 10 and 11 for a purpose that will presently appear, said stops consisting, in the present instance, of screws that are threaded through said blocks. The frame 8 is otherwise constructed of tubular cross members 17 and braces 18 whose inner ends are engaged over bosses 19 that extend laterally from the racks 9 and to which said members and braces are secured by pins 20. It is clear from what has just been said that the frame 8 constitutes a unit that is pivotally connected to the rear end of the superstructure of the vehicle on an axis extending transversely thereof; and that a relatively long slot—the space between the racks 9—extends vertically throughout its middle portion in the plane of the longitudinal axis of the vehicle.

Extending through and operating vertically within this slot or, in other words, within the space between the racks 9, is a member designated 24 that constitutes the rear terminal of a Y-shaped frame or unit designated generally by the reference numeral 25. The forwardly diverging branches 26 of the frame or unit 25 consist of substantial channel members whose rear ends are connected to the member 24, as by bolts 27, and whose forward ends terminate in bearings 28 that are journaled on studs 29. These studs are shown as carried by fittings 30 that are secured by fastening means or bolts 31 to the side members 2 of the vehicle frame or chassis. Axle supports 33 extend downwardly and forwardly from the branches 26 of the frame or unit 25 and are arranged to project beneath the axle 3 when the frame or unit is lowered to the position illustrated in Figs. 2 and 3. Normally, said supports are withdrawn from beneath the axle, as in Fig. 4. Members 35 are clamped to the axle 3 in the vertical planes of the supports 33 and carry rollers 36 for engagement with said supports.

Carried by, and extending rearwardly from, the member 24 is a spindle 40 on which is rotatably mounted, through the intervention of anti-friction bearings 41, a hub 42. This is preferably a standard hub on which the spare wheel 43 may be mounted in the usual way and to which it may be secured by nuts 44 applied to studs 45. It may be explained that in cases where only spare tires and rims are carried, a wheel will be provided in lieu of the one designated 43 on which the rim may be mounted according to common practice, and for our present purpose we prefer to term the spare wheel, or the wheel on which the spare tire and rim are mounted, the ground wheel of the parking device.

Constituting a part of the hub structure is a flanged member 46 within the peripheral portion of which is secured, as by rivets 47, an internal gear 48. Meshing with this gear is a pinion 49, formed on the rear end of a spindle 50 that is journaled in a bushing 51. This bushing is mounted within the upper rear portion of the member 24, and applied to a flange 52 of said member that is disposed transversely of the axes of the spindles 40 and 50 is a plate 53 that closes the cavity of the member 46 within which the internal gear 48 is housed. An element 54 interlocks with the rear portion of the spindle 50 and prevents forward displacement of the spindle within the bushing 51.

Suitably secured to the front side of the member 24 is a housing 55 having a substantially central opening that is surrounded by a boss 56 within which is mounted an anti-friction bearing 57. Journaled within this bearing is the forward end of a shaft 58 whose rear end is reduced and piloted within a bushed axial recess 59 of the spindle 50. A bushed sleeve 60 is mounted on the shaft 58, and its movement in a forward direction is prevented by an enlargement 61 on the shaft. Clutch faces are formed on the opposed ends of the spindle 50 and sleeve 60, while the portion of the shaft 58 between said faces is fluted, as indicated at 62, and slidable upon the fluted portion of the shaft is a clutch member 63, the same having clutch faces for cooperation with the previously mentioned clutch faces of the spindle 50 and sleeve 60.

Fastened to the forward end of the shaft 58 is a worm wheel 65 with which a worm 66 meshes (Figs. 6 and 9). The worm is shown as formed on a shaft 67, one end of which is journaled, through an anti-friction bearing 68, within a boss 69 of the housing 55, while the opposite end of the shaft has driving connection, as through the medium of the key 70, with the armature shaft 71 of an electric motor 72 whose casing is secured, as by screws 73, to a part 74 of the housing 55.

Secured by a pin 75, or otherwise, to the sleeve 60 is the hub portion of a bevel gear 76 that meshes with a similar gear 77 formed on the upper end of a shaft 78 that is journaled in bushed bearings in the member 24, the bearings being so disposed as to sustain said shaft 78 with its axis substantially tangent to the arc of the racks 9. The member 24 is recessed, as shown at 80, between the bearings in which the shaft 78 is journaled, and accommodated by the recessed portion of said member is an angle gear 81 that is keyed or otherwise secured to the shaft 78, a thrust bearing 82 being interposed between the lower side of said gear and the opposed portion of the member 24. The angle gear 81 meshes with the opposed racks 9, as best shown in Figs. 8 and 10.

Surmounting the member 24, immediately to the rear of the portion of housing 55 that encloses the worm 66, is a solenoid casing 85, and extending downwardly and rearwardly from said casing are laterally spaced ears 86 within which is supported a shaft 87. Mounted on the shaft between said ears is the hub portion of a bell crank lever 88, having a forwardly extending branch 89 whose terminal is in axial alignment with the solenoid casing 85. The other, or downwardly extending, branch 90 of said lever terminates in a fork 91 which straddles and cooperates in the usual way with the clutch member 63. It is evident that when the bell crank lever 88 is rocked it will shift the clutch member 63 longitudinally of the shaft 58, and the same is normally held in a position to engage the clutch member with the clutch face of the sleeve 60 by a spring pressed plunger 93 that is guided within a part 94 attached to the top of the member 24 rearwardly of the bell crank 88.

A solenoid 98 occupies the casing 85, and the core 99 thereof is normally held elevated by a spring 100 that is interposed between an abutment, formed in the present instance by the head of a screw 101, carried by and spaced a suitable distance above the upper end of the core, and a seat 102 that fits within an extension 103 of the casing. The casing extension 103 is closed at its upper end by a cap 104 and both said extension and cap are of insulating material. A suitably shaped block 105 is interposed between the casing 85 and extension 103 and serves as a partition to separate the interior of the solenoid casing from that of the casing extension 103. Within the extension is located a switch that is shown in detail in Figs. 15 and 16, and which we will now describe.

The upper end portion of the solenoid core is reduced in two steps, producing a shoulder 107, and loosely mounted upon the part of lesser diameter is a disk 108 of insulating material, the same being held downwardly against the shoulder 107 by a spring 109 that surrounds the aforesaid part of the solenoid core and is confined between said disk and an abutment 110 that is held in place by the previously mentioned screw 101. A metal annulus 111 is secured to the underside of the disk 108 for engagement with contact members 112. This switch will be referred to, generally, as the solenoid switch 115.

A pin 116 extends from the lower end of the solenoid core 99 through a guide 117, and its lower end is disposed immediately above the forward terminal of the branch 89 of the bell crank lever 88. It is evident from this that when the solenoid is energized and its core drawn downwardly against the tension of spring 100, the pin 116 will engage the bell crank and rock it in a direction to shift the clutch member 63 into engagement with the clutch face of the spindle 50.

Mounted for oscillation on the outer ends of the same shaft 87 by which the bell crank 88 is supported is a frame 119 of what we may term, by reason of its function, the top limit switch, the same being designated generally by the reference numeral 120. A bar 121 of conducting material constitutes the front member of the frame 119 and the same is adapted to engage and bridge contact members 122. These contact members are supported by, and insulated from, depending portions 123 of the solenoid casing 85, the contact members incorporating binding posts 124. The portions of the contact members wherewith the bar 121 engages are supported by a block 125 of insulating material, suitably secured to the lower ends of said portions 123 of the solenoid casing. A spring 126, shown in dotted lines in Fig. 18, tends to depress the forward end of the frame 119 thereby to engage the bar 121 with the contact members 122. The rear end 127 of the frame 119 is adapted to engage the previously mentioned stop 15, when the member 24 travels to the upper limit of its movement, and such engagement of the end of the frame with the stop 15 will cause the frame to be rocked against the tension of the spring 126 and the bar 121 to be withdrawn from the contact members 122.

A bottom limit switch, designated generally 130, and shown in detail in Figs. 6 and 7, is arranged for cooperation with the stop 16. This switch consists of a lever 131 that is pivotally supported by a pin 132 that is carried by the member 24. Extending transversely through the forward end of the lever, and insulated from it, is a bar 133 arranged to engage contact members 134 that are mounted on a block 135 of insulating material. A binding post 136 is electrically connected to each of the contact members 134 and is supported by the block 135. A spring 137, contained within a recess of the member 24, engages the rear end of the lever 131 and normally holds said end depressed so as to engage the bar 133 with the contact members 134.

In order that the working parts of the device may be protected from dirt and the elements when in their usual or normal positions, we provide casing parts 140 and 141 that are carried by the member 24 and consequently move up and down with it with respect to the racks 9. Each of the casing parts 140 and 141 have side flanges designated 142 that are of the same length and curvature as the edges of the racks 9 wherewith they cooperate, and said flanges having longitudinal grooves containing packing 143 for more effectively closing the joints between the casing parts and the racks. Below the member 24 the side flanges 142 are connected by webs 145 (Figs. 3 and 11), the joint between the underside of said member and the tops of said webs being sealed by strips 146 of packing material. The space between the upper ends of the side flanges of the casing part 141 is bridged by a curved wall section 147 that is integral with the previously mentioned part 94 in which the spring pressed plunger 93 is guided. As seen from Fig. 10, the casing parts 140 and 141 are secured to the member 24 by screws 148.

The manually operated switches through which the device is controlled are preferably incorporated in a single unit designated 150 that is mounted in convenient reach of the driver, preferably on the dash or instrument board of the vehicle. The unit is illustrated in detail in Figs. 12, 13 and 14 and the same incorporates a double throw switch to which the numeral 151 refers in a general way, and also a push button switch designated generally 152. The former switch consists of two pairs of contact members 153 and 154, and a lever 155 that is pivoted on a pin 156 carried by a base 157, preferably of insulating material. The contact members 153 and 154 are equipped with binding posts 158 and are mounted in supports 159 of insulating material that are connected to and extend from the base 157. These supports carry spring pressed plungers 160, with their casings 161, and said plungers engage opposite sides of the lever 155 and tend to retain it in central position. A bar 165 extends through and is insulated from the free end of the lever and is arranged to engage the opposite pairs of contact members 153 and 154 when the lever is swung, by means of its handle 166, in opposite directions against the action of the spring pressed plungers 160.

The switch 152 which, in the present instance, is in the nature of a push button switch, is located adjacent the top of the unit 150, and the same consists of contact members 169 formed by the heads of binding posts 170, said heads being disposed within a cavity 171 of the base 157, while the shanks of the binding posts pass through apertures in the base. A front plate 72 is applied to the base 157 and has a circular opening 173 in register with the cavity 170, and an elongated opening 174 through which the lever 155 projects. A bar 175 extends lengthwise of the cavity 171 and has a central boss 176 to which is applied a button 177 of insulating material that occupies the opening 173. A compression spring 178 tends to maintain the bar 175 out of engagement with the contact members 169, the opposite ends of said spring being accommodated by recesses in the base 157 and in the boss 176, respectively.

Reference is now made to the wiring diagram of Fig. 20 in which a battery 180 is shown. This battery constitutes the source of power for the motor 72 and solenoid 98 of the parking device, and it may be, and preferably is, the battery of the automotive vehicle in which the device is incorporated.

Since the device is illustrated in operative position in the majority of the views—that is, with the wheel 43 in engagement with the ground and the adjacent end of the vehicle lifted—the description of a cycle of operation of the device will proceed from this point. When the parts are in the position referred to, the limit switch 130 will be open, as shown in full lines in Fig. 20, and the limit switch 120 will be closed, as illustrated in a similar manner in said view. It will be assumed that the vehicle is standing parallel to the curb, as shown in dot-and-dash lines in Fig. 1, and that it is desired to swing the rear end of the vehicle outwardly away from the curb until the vehicle occupies the position shown in full lines in said view, preparatory to lowering the driving wheels of the vehicle onto the ground and backing the vehicle out into the highway away from the curb. The operator pushes the button 177 to close the switch 152 which will result in current flowing from the positive side of the battery 180, through a conductor 181, switch 152, conductor 182, to the winding of the solenoid 98. The negative side of the battery is grounded through a conductor 183 to a convenient part of the vehicle frame, as is also the winding of the solenoid, through a conductor 184. Consequently, upon the closing of the switch 152, the circuit will be completed. Upon energization of the solenoid, its core 99 will be drawn downwardly against the action of the spring 100 to project the pin 116 and rock the bell crank lever 88 in a direction to shift the clutch member 63 into engagement with the clutch face of the spindle 50. The operator, while holding the button 177 depressed, swings the lever 155, by means of its handle 166, in a direction to engage the bar 165 with the contact members 154. This will result in current flowing from the battery 180 through conductors 181, 185, 186, the contact members 154 and bar 165, conductor 187, solenoid switch 115 (which has been closed by reason of the energization of the solenoid), conductor 188, the field 72ª of the motor 72, the armature winding of the motor and conductor 189 to the ground and thence to the other side of the battery. Upon the establishment of this circuit, the motor 72 will be driven in a direction to turn the ground wheel 43 in such manner as to propel the vehicle outwardly and when it is as far out from the curb as necessary the button 177 is released allowing the switch 152 to open thereby to deenergize the solenoid and allow the spring pressed plunger 93 to swing the bell crank lever 88 in a direction to engage the clutch member 63 with the clutch face of the sleeve 60. The lever 155 is now swung in a direction to engage the bar 165 with the contact members 153 whereupon current will flow from the battery through conductors 181, 185, 190, from one contact member 153 to the other through the bar 165, conductor 191, switch 120 and conductor 192 to the field 72ᵇ of the motor 72 and thence through the armature winding of the motor and the conductor 189 to the ground. Under this arrangement, the motor is driven in a direction to rotate the angle gear 81 through the intervention of the worm 66, worm wheel 65, shaft 58, bevel gears 76 and 77 and the shaft 78, in a direction to cause it to move the racks 9 downwardly thereby to lower the adjacent end of the vehicle until the driving wheels thereof reach the ground and thereafter to cause said angle gear to climb the racks 9 and lift the rear end of the frame or unit 25, the parts continuing to ascend until the end 127 of the frame 119 engages the stop 15 thereby to open the top limit switch 120.

It will be understood that just as soon as the lever 131 of the bottom limit switch 130 left the stop 16, the spring 137 swung the lever in a direction to bridge the contact member 134 of said switch by the bar 133, thereby conditioning the device for its next operation. Such operation is initiated by throwing the lever 155 of the switch 150 in a direction to engage the bar 165 with the contact members 154 whereupon current will flow from the battery through conductors 181, 185 and 186, the contact members 154 and the bar 165, conductors 187 and 195, the bottom limit switch 130, conductor 196 and the previously mentioned conductor 188 to the field 72ª of the motor 72 and thence through the armature winding and conductor 189 to the ground. This will cause the motor to be driven in a direction to lower the frame or unit 25 so as to project the axle supports 33 beneath the axle and engage the wheel 43 with the ground and lift the adjacent end of the vehicle, including the rear axle 3, so as to free the wheels carried by said axle from the ground. Upon the attainment of this result the operation of the device will be automatically stopped by the engagement of the lever 131 of the bottom limit switch 130 with the stop 16. The operator now depresses the button 177 to close the switch 152 and energize the solenoid through the circuit previously described, thereby shifting the clutch into driving engagement with the spindle 50; and while the button is held depressed, the operator swings the lever 155 of the switch 150 in a direction to engage the bar 165 with the contact members 153 whereby current will be caused to flow from the battery through the conductors 181, 185, 190, the contact members 153 and bar 165, the conductor 191, top limit switch 120 and conductor 192 to the field 72ᵇ of the motor and thence through the armature winding and conductor 189 to the ground. This will result in driving the motor in a direction to propel the vehicle inwardly toward the curb.

It will be readily seen from the foregoing description of the operation of the device that by a proper manipulation of the switches of the control unit 150, which may be accomplished with one hand, the driver may raise and lower the end of the vehicle to which the device is applied at will and propel it laterally in either direction and to whatever extent he wishes.

It is also apparent that our invention provides an efficient, durable and thoroughly reliable parking equipment that may be installed in modern automotive vehicles without detracting in any way from the good appearance of the vehicle, the device being inconspicuous, neat and compact, as well as light of weight and exceedingly convenient of operation.

Having thus described our invention, what we claim is:

1. In a parking device for vehicles, the combination with the vehicle axle and the superstructure spring suspended therefrom; of a unit movably connected to the superstructure and incorporating a ground wheel and an axle support that are in fixed relation to each other and are movable together, the support by reason of such fixed relation being positively projected beneath the axle when said wheel is engaged with the ground through a lowering of the unit, and means for raising and lowering said unit.

2. In a parking device for vehicles, the combination with the vehicle axle and the superstructure spring suspended therefrom; of a unit movably connected to the superstructure and incorporating a ground wheel and an axle support that are in fixed relation to each other and are movable together, the support by reason of such fixed relation being positively projected beneath the axle when said wheel is engaged with the ground through a lowering of the unit, and means for raising and lowering said unit and for driving said wheel.

3. In a parking device for vehicles, the combination with the vehicle axle and the superstructure spring suspended therefrom; of a unit movably connected to the superstructure and incorporating a ground wheel and axle support, the latter being arranged to project beneath the axle when said wheel is engaged with the ground, a second unit directly connected to the superstructure, mechanism for effecting relative movement between said units whereby the first is caused to descend and engage the aforesaid wheel with the ground and project the aforesaid support beneath the axle, and the second unit is caused to ascend with respect to the first thereby to lift the superstructure and axle, and means for driving said mechanism.

4. In a parking device for vehicles, the combination with the vehicle axle and the superstructure spring suspended therefrom; of a unit movably connected to the superstructure and incorporating a ground wheel, said unit including an axle support that is adapted to be projected beneath the axle when the unit is moved in a direction to engage the aforesaid wheel with the ground, a second unit directly connected to the superstructure, mechanism for effecting relative movement between said units whereby the first is caused to descend and engage the aforesaid wheel with the ground and the second is caused to ascend with respect to the first, and vice versa, and means for driving said mechanism in reverse directions.

5. In a parking device for vehicles, the combination with the vehicle axle and the superstructure spring suspended therefrom; of a unit pivotally connected at one end to the superstructure and incorporating a ground wheel at its opposite end, said unit including an axle support that is adapted to be projected beneath the axle when the unit is moved in a direction to engage the aforesaid wheel with the ground, a second unit connected to the superstructure, mechanism for effecting relative movement between said units whereby the first is caused to descend and engage the aforesaid wheel with the ground and the second is caused to ascend with respect to the first, and vice versa, and reversible means for driving said mechanism.

6. In a parking device for vehicles, the combination with the vehicle axle and the superstructure spring suspended therefrom; of a unit pivotally connected at one end to the superstructure in the region of the axle and incorporating a ground wheel at its opposite end, said unit including an axle support that is adapted to be projected beneath the axle when the unit is swung downwardly to engage said wheel with the ground, a second unit pivotally connected to the superstructure, said units having cooperating parts whereby they are restricted to relative movement in a given path, mechanism for effecting relative movement between the units, and means for driving said mechanism in reverse directions.

7. In a parking device for vehicles, the combination with the vehicle axle and the superstructure spring suspended therefrom; of a unit pivotally connected at one end to the superstructure in the region of the axle and incorporating a ground wheel at its opposite end, said unit including an axle support that is adapted to be projected beneath the axle when the unit is swung downwardly to engage said wheel with the ground, a second unit pivotally connected to the superstructure, said units having cooperating parts whereby they are restricted to relative movement in a given path, mechanisms for effecting, respectively, relative movement between the units and rotation of said wheel, a reversible prime mover, and means for establishing driving connections between said prime mover and either of said mechanisms.

8. In a parking device for vehicles, the combination with the vehicle axle and the superstructure spring suspended therefrom; of a unit movably connected to the superstructure and incorporating a ground wheel and an axle support, the latter being adapted to be projected beneath the axle when said unit is lowered to engage the aforesaid wheel with the ground, a second unit directly connected to the superstructure, mechanism for effecting relative movement between said units whereby the first is caused to descend and engage said wheel with the ground and the latter is caused to ascend with respect to the first and lift the superstructure, and vice versa, reversible driving means, and separable driving connections between said driving means and said mechanism and between said means and the ground wheel.

9. In a parking device for vehicles, the combination with the vehicle axle and the superstructure spring suspended therefrom; of a unit movably connected to the superstructure and incorporating a ground wheel and an axle support that is arranged to be projected beneath the axle when said unit is moved in a direction to engage the aforesaid wheel with the ground, a second unit directly connected to the superstructure, mechanism for effecting relative movement between said units whereby the first is caused to descend and engage the said wheel with the ground and the second unit is caused to ascend with respect to the first to lift the superstructure and axle, and vice versa, reversible driving means, separable driving connections between said means and said mechanism and between said means and the ground wheel, and an automatic control for stopping the operation of said driving means when the units have reached the limit of their relative movement in either direction.

10. In a parking device for vehicles, the combination with the vehicle axle and a superstructure spring suspended therefrom; of a unit pivoted to the end of the superstructure adjacent the axle, a second unit pivoted to the superstructure at a point between the vertical planes of the axle and the pivotal axis of the aforesaid unit, the second unit carrying a ground wheel at its free end and having axle supports that are adapted to be projected beneath the axle when the second mentioned unit is lowered to engage the aforesaid wheel with the ground, the first mentioned unit having opposed gear racks that are substantially concentric with the pivotal axis of the second mentioned unit, gearing carried by the second unit for cooperation with said racks, and driving means for operating said gearing.

11. In a parking device for vehicles, the combination with the vehicle axle and a superstructure spring suspended therefrom; of a unit pivoted to the end of the superstructure adjacent the axle, a second unit pivoted to the superstructure at a point between the vertical planes of the axle and the pivotal axis of the aforesaid unit, the second unit carrying a ground wheel at its free end and having axle supports that are adapted to be projected beneath the axle when the second mentioned unit is lowered to engage the aforesaid wheel with the ground, the first mentioned unit having opposed arcuate angular gear racks that are substantially concentric with the pivotal axis of the second mentioned unit, mechanism carried by the second unit incorporating an angle gear meshing with the aforesaid racks, and driving means for operating said mechanism.

12. In a parking device for vehicles, the combination with the vehicle structure, of two units pivotally connected thereto, one of said units incorporating arcuate racks substantially concentric with the pivotal axis of the other unit, mechanism carried by said other unit and incorporating a driving element that cooperates with said racks, means for driving said mechanism, and a ground wheel carried by one of said units.

13. In a parking device for vehicles, the combination with the vehicle structure, of two units pivotally connected thereto, one of said units incorporating arcuate racks substantially concentric with the pivotal axis of the other unit, mechanism carried by said other unit and incorporating a driving element that cooperates with said racks, casing parts also carried by said other unit and cooperating with said racks to enclose and protect said mechanism when said parts and racks are in a given relation, means for driving said mechanism, and a ground wheel carried by one of said units.

14. A parking device for vehicles comprising, in combination, a unit movably connected to the vehicle and incorporating a ground wheel, mechanisms for raising and lowering said unit and for rotating said wheel, respectively, a reversible electric motor, means when in one position for establishing driving connections between said motor and one of said mechanisms, and when in another position for effecting driving connections between the motor and the other of said mechanisms, electromagnetic means for actuating the former means, a circuit including said motor, a reversing switch in said circuit, a second switch, and a circuit including the same and said electromagnetic means.

15. A parking device for vehicles comprising, in combination, a unit movably connected to the vehicle and incorporating a ground wheel, mechanisms for raising and lowering said unit and for rotating said wheel, respectively, a reversible electric motor, means when in one position for establishing driving connections between said motor and one of said mechanisms, and when in another position for effecting driving connections between the motor and the other of said mechanisms, said means being biased toward one of said positions, electromagnetic means for shifting the former means to the other of said positions, a circuit including said motor, a reversing switch in said circuit, a second switch, and a circuit including the same and said electromagnetic means.

16. A parking device for vehicles comprising, in combination, a unit movably connected to the vehicle and incorporating a ground wheel, mechanisms for raising and lowering said unit and for rotating said wheel, respectively, a reversible electric motor, means when in one position for establishing driving connections between said motor and one of said mechanisms, and when in another position for effecting driving connections between the motor and the other of said mechanisms, said means being biased toward one of said positions, electromagnetic means for shifting the former means to the other of said positions, a circuit including said motor, a reversing switch in said circuit, a second switch, and a circuit including the same and said electromagnetic means, said switches having actuators arranged in proximity to each other for simultaneous manipulation by means of one hand.

17. A parking device for vehicles comprising, in combination, a unit movably connected to the vehicle and incorporating a ground wheel, mechanisms for raising and lowering said unit and for rotating said wheel, respectively, a reversible electric motor, means when in one position for establishing driving connection between said motor and one of said mechanisms and when in another position for effecting driving connections between the motor and the other of said mechanisms, electromagnetic means for actuating the former means, a circuit including said motor, a manually operated reversing switch in said circuit, a second manually operated switch, a circuit including the same and said electromagnetic means, and top and bottom limit switches in the motor circuit that are adapted to be automatically opened, respectively, when said unit is raised and lowered to the limits of its movement.

18. A parking device for vehicles comprising, in combination, a unit movably connected to the vehicle and incorporating a ground wheel, mechanism for raising and lowering said unit, a reversible electric motor for driving said mechanism, a branched circuit including said motor, a double throw reversing switch for controlling the flow of current through the branches of said circuit, and top and bottom limit switches, one within each branch of said circuit, adapted to be automatically opened, respectively, when said unit is raised and lowered to the limits of its movement.

19. A parking device for vehicles comprising, in combination, a unit movably connected to the vehicle and incorporating a ground wheel, mechanisms for raising and lowering said unit and for rotating said wheel, respectively, a reversible electric motor, means when in one position for establishing driving connections between said motor and one of said mechanisms, and when in another position for effecting the driving connections between the motor and the other of said mechanisms, and electrical means for actuating the former means.

20. In a parking device for vehicles, the combination with the vehicle axle and a superstructure spring suspended therefrom, of a unit pivoted to the end of the superstructure adjacent the axle, a second unit pivoted to the superstructure at a point between the vertical planes of the axle and the pivotal axis of the aforesaid unit, the second unit carrying a ground wheel at its free end and having axle supporting means adapted to be projected beneath the axle when the second mentioned unit is lowered to engage the aforesaid wheel with the ground, one unit having opposed gear racks that are substantially concentric with the pivotal axis of the second mentioned unit, gearing carried by the other unit for cooperation with said racks, and driving means for operating said gearing.

CHRISTIAN GIRL.
FRANCIS M. CASE.